(12) United States Patent
Wang et al.

(10) Patent No.: US 10,018,766 B2
(45) Date of Patent: Jul. 10, 2018

(54) LIGHT GUIDE PLATE, BACKLIGHT MODULE AND DISPLAY DEVICE

(71) Applicant: BOE TECHNOLOGY GROUP CO., LTD., Beijing (CN)

(72) Inventors: Shang Wang, Beijing (CN); Qiuxiang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 117 days.

(21) Appl. No.: 14/538,045

(22) Filed: Nov. 11, 2014

(65) Prior Publication Data

US 2015/0331173 A1    Nov. 19, 2015

(30) Foreign Application Priority Data

May 16, 2014 (CN) .......................... 2014 1 0207203

(51) Int. Cl.
   *G02B 6/34* (2006.01)
   *F21V 8/00* (2006.01)
   *G02F 1/1335* (2006.01)

(52) U.S. Cl.
   CPC ......... *G02B 6/0036* (2013.01); *G02B 6/0053* (2013.01); *G02B 6/0066* (2013.01);
   (Continued)

(58) Field of Classification Search
   CPC .. G02B 6/0015; G02B 6/0016; G02B 6/0036; G02B 6/0043; G02B 6/0053
   (Continued)

(56) References Cited

U.S. PATENT DOCUMENTS 5,390,276 A * 2/1995 Tai ..................... G02B 6/0036
                                                        362/561
5,838,404 A * 11/1998 Ozeki ................. G02B 6/0038
                                                        349/57
(Continued)

FOREIGN PATENT DOCUMENTS

| CN | 101688991 A | 3/2010 | |
| CN | 102890307 A * | 1/2013 | .......... G02B 6/0036 |
| CN | 102943980 A * | 2/2013 | |

OTHER PUBLICATIONS

1st Office Action issued in Chinese Application No. 201410207203.8 dated Jan. 4, 2016.

*Primary Examiner* — Elmito Breval
*Assistant Examiner* — Keith Delahoussaye
(74) *Attorney, Agent, or Firm* — Nath, Goldberg & Meyer; Joshua B. Goldberg

(57) ABSTRACT

The present invention discloses a light guide plate, a backlight module and a display device. In the light guide plate, a plurality of triangular pyramid dots are provided; two of four surfaces of each of the triangular pyramid dots are light receiving surfaces facing a backlight source, and are reflective mirror surfaces, so that incident light reaching the two light receiving surfaces from the backlight source is converted into emergent light exiting in two different directions, and then the emergent light is emitted out from the upper surface of the light guide plate. In the solution, as the triangular pyramid dots capable of converting incident light from a backlight source into emergent light exiting in two specific directions are provided in a light guide plate, the effect of dual-view backlight can be realized while providing a light guide plate or dual-view backlight module with simpler structure and lower cost.

16 Claims, 3 Drawing Sheets

(52) U.S. Cl.
CPC ...... *G02F 1/133605* (2013.01); *G02B 6/0055* (2013.01); *G02B 6/0058* (2013.01)

(58) Field of Classification Search
USPC .................................................. 362/606, 607
See application file for complete search history.

(56) References Cited

U.S. PATENT DOCUMENTS

| | | | | |
|---|---|---|---|---|
| 2004/0042196 | A1* | 3/2004 | Kraft | G02B 6/002 |
| | | | | 362/602 |
| 2011/0261584 | A1* | 10/2011 | Boyd | G02B 6/0053 |
| | | | | 362/607 |
| 2012/0045171 | A1* | 2/2012 | Chen | G02B 6/0036 |
| | | | | 385/36 |
| 2012/0081926 | A1 | 4/2012 | Yu et al. | |

* cited by examiner

LIGHT GUIDE PLATE, BACKLIGHT MODULE AND DISPLAY DEVICE

FIELD OF THE INVENTION

The present invention relates to the technical field of display, and particularly to a light guide plate, a backlight module and a display device.

BACKGROUND OF THE INVENTION

At present, with the continuous development of display techniques, a dual-view display capable of providing different display images for different users by using a same display screen has been developed. The dual-view display may be mainly applied to vehicle-mounted display devices. With the function of realizing different images at different view angles by using a single display screen, the dual-view display may realize display functions of two displays by using a single display, so that the cost and occupied space of display devices may be greatly reduced.

Specifically, as shown in FIG. 1, at present, a dual-view display has the following basic requirements for a display angle: the range of a visual angle is 22.5-45 degrees; and, to achieve better dual-view display effects, a center of the field of view is preferably at about 30 degrees, and the specific setting may be determined according to practical application of the display device. Further, on this basis, the prior art provides a solution for realizing dual-view backlight by disposing multiple layers of prism films on a light guide plate (specifically referring to Chinese Patent Application No. 200810170130.4, Publication No. CN101398569A), in which the multiple layers of prism films may include a group of corresponding prism films of which the prism axes (ridges of prisms) are configured in parallel in upper and lower direction with respect to a liquid crystal image, and a group of corresponding prism films of which the prism axes are configured consistently in left and right direction with respect to the liquid crystal image. In the above patent application document, with a backlight module having the multiple layers of prism films, high light condensation characteristics and relatively high brightness may be achieved in left and right direction, so that it can be applicable to dual-view displays mounted in vehicle navigation devices, etc.

However, in the backlight module or the dual-view display having the backlight module provided in the above patent application document, the multiple layers of prism films with relatively complicated structure are used to realize dual-view backlight, so that the structure of the dual-view backlight module is relatively complicated; moreover, due to the presence of the multiple layers of prism films, the thickness of the dual-view backlight module and/or the dual-view display will be increased to a certain extent, which is disadvantageous for the lightening and thinning of a display device. Therefore, it is necessary to provide a new dual-view backlight solution to solve the above problems.

SUMMARY OF THE INVENTION

Embodiments of the present invention provide a light guide plate, a backlight module and a display device, in order to solve the problems that the present dual-view backlight module has relatively complicated structure and is not light and thin enough.

The embodiments of the present invention provide a light guide plate, in which a plurality of triangular pyramid dots are provided in the light guide plate; and two of four surfaces of each of the triangular pyramid dots are light receiving surfaces facing a backlight source and the two light receiving surfaces are reflective mirror surfaces, so that incident light reaching the two light receiving surfaces from the backlight source is reflected and becomes emergent light exiting in two different directions, and then the emergent light is emitted out from an upper surface of the light guide plate.

In the technical solutions provided by the embodiments of the present invention, as the plurality of triangular pyramid dots capable of converting incident light from a backlight source into emergent light in two specific directions are provided in a light guide plate, the effect of dual-view backlight may be realized, while a dual-view backlight structure with simpler structure and lower cost is provided.

Further, the two light receiving surfaces are both coated with a highly reflective material, to achieve the effect of reflecting the incident light received from the backlight source onto the upper surface of the light guide plate to a large extent.

Further, the highly reflective material is any one or a combination of more of silver, aluminum and copper.

Further, the two light receiving surfaces are coated with the same highly reflective material. Further, a bottom surface of each of the triangular pyramid dots is parallel to a lower surface of the light guide plate, to achieve the purpose of equivalently reflecting the incident light.

Further, the bottom surface of each of the triangular pyramid dots is isosceles triangle shaped.

Further, a projection of a ridge between the two light receiving surfaces of each of the triangular pyramid dots on the lower surface of light guide plate is parallel to a direction of the incident light from the backlight source, so that the two light receiving surfaces may uniformly receive the incident light from the backlight source.

Further, a surface other than the bottom surface and the two light receiving surfaces of each of the triangular pyramid dots is a light absorbing surface. That is to say, outgoing of parasitic light in the light guide plate can be effectively reduced by providing the light absorbing surface which does not reflect light basically, so that both the directivity of the emergent light of the backlight module and the confidentiality of the whole display device are improved.

Further, length of a ridge between the light receiving surfaces and the light absorbing surface is not greater than that of other two ridges of the light receiving surfaces. That is to say, by setting the two light receiving surfaces as surfaces having larger area than that of the light absorbing surface, the purpose of reflecting the incident light from the backlight source onto the upper surface of the light guide plate to a large extent may be achieved.

Further, the triangular pyramid dots are a plurality of regular triangular pyramid dots of the same size.

Further, density of the plurality of triangular pyramid dots is gradiently distributed in the light guide plate, the farther a region is away from the backlight source, the larger the density of the triangular pyramid dots in the region is. That is to say, with a structure in which the density of the triangular pyramid dots varies, the purpose of converting the incident light from the backlight source into uniform emergent light for uniformly illuminating the corresponding region of a liquid crystal display screen to form relatively uniform backlight may be achieved.

Further, a view angle control prism layer, which is configured to control a view angle and a direction of emergent light exiting from the upper surface of the light guide plate, is provided on the upper surface of the light guide plate. Specifically, when light exiting from the upper surface of the light guide plate passes through the view angle control prism layer, the effects of light convergence, ray angle deviation and so on may occur due to the refraction by the prism layer, so the purpose of reducing the view angle of the light guide plate or realizing the angle deviation of the emergent light may be achieved.

Further, the view angle control prism layer is provided with a plurality of triangular prisms, central axes of the triangular prisms are parallel to each another, and ridges between two refracting surfaces of the triangular prisms are arranged in a same plane.

Further, the plurality of triangular prisms are the same in size and shape.

Further, the embodiments of the present invention further provide a backlight module, which includes a backlight source and a light guide plate arranged at a side of the backlight source, wherein the light guide plate is any of the above-mentioned light guide plates in the embodiments of the present invention.

Further, the backlight source is a collimating light source.

Further, the embodiments of the present invention further provide a display device, which includes any of the above-mentioned backlight modules in the embodiments of the present invention.

The present invention has the following advantages:

The embodiments of the present invention provide a light guide plate, a backlight module and a display device, a plurality of triangular pyramid dots are provided in the light guide plate, two of four surfaces of each of the triangular pyramid dots are light receiving surfaces facing a backlight source, and the two light receiving surfaces are reflective mirror surfaces, so that incident light reaching the two light receiving surfaces from the backlight source is reflected and becomes emergent light exiting in two different directions, and then the emergent light is emitted from the upper surface of the light guide plate. In the technical solutions provided by the embodiments of the present invention, as the triangular pyramid dots capable of converting incident light from a backlight source into emergent light exiting in two specific directions may be provided in a light guide plate, the effect of dual-view backlight may be realized, while a dual-view backlight structure with simpler structure and lower cost is provided.

BRIEF DESCRIPTION OF THE DRAWINGS

To describe the technical solutions in the embodiments of the present invention more clearly, the accompanying drawings to be used for describing the embodiments will be briefly introduced as below. Apparently, the accompanying drawings in the following description are merely some embodiments of the present invention, and those of ordinary skill in the art may obtain other drawings from these accompanying drawings without any creative effort.

DETAILED DESCRIPTION OF THE EMBODIMENTS

To make the object, technical solutions and advantages of the present invention clearer, the present invention will be further described as below in details with reference to the accompanying drawings. Apparently, the described embodiments are merely a part of but not all of embodiments of the present invention. Based on the embodiments in the present invention, all of other drawings made by those of ordinary skill in the art without any creative effort shall fall into the protection scope of the present invention.

Figure 1:
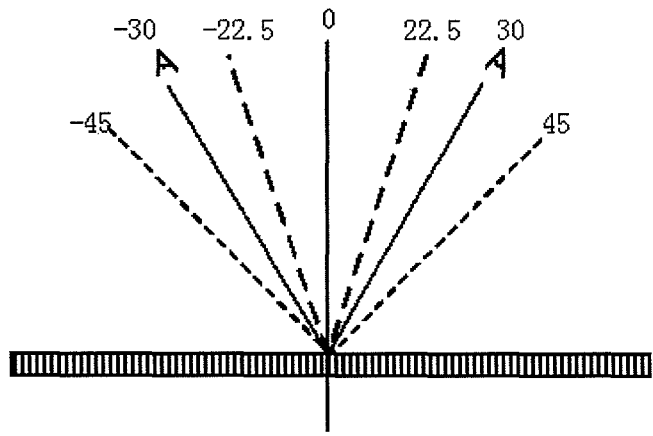
FIG. 1 is a schematic diagram of a display angle of a dual-view display.
Figure 2:
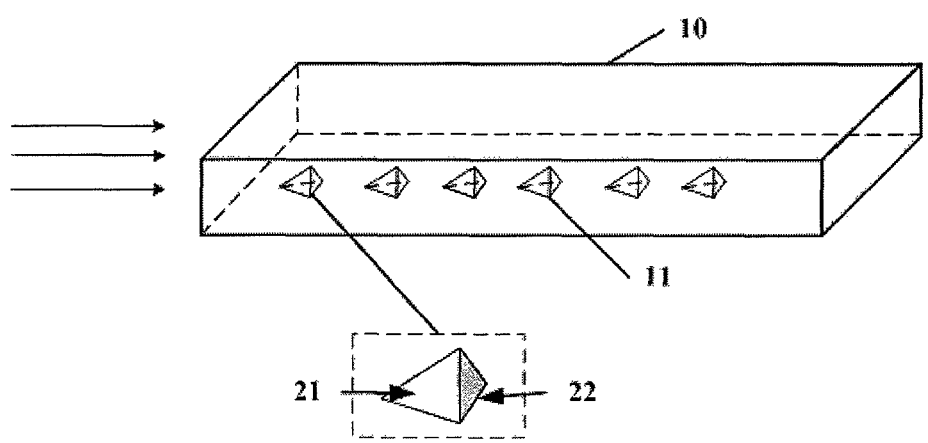
FIG. 2 is a schematic diagram of a structure of a light guide plate provided by an embodiment of the present invention.
Figure 3:
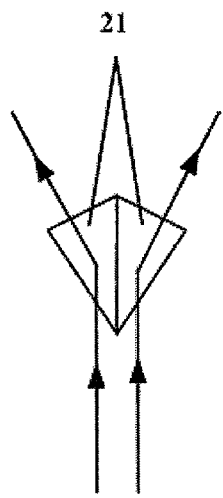
FIG. 3 is a schematic diagram illustrating light splitting of a triangular pyramid unit provided by an embodiment of the present invention.

Embodiments of the present invention provide a light guide plate. FIG. 2 shows a schematic diagram of a structure of a light guide plate 10 provided by an embodiment of the present invention. A plurality of triangular pyramid dots 11 may be provided in the light guide plate 10; and two of four surfaces of each of the triangular pyramid dots 11 are light receiving surfaces 21 facing a backlight source and the two light receiving surfaces are reflective mirror surfaces, so that incident light reaching the two light receiving surfaces from a backlight source is reflected and becomes emergent light exiting in two different directions, and then the emergent light is emitted from the upper surface of the light guide plate 10. Specifically, by taking one of the triangular pyramid dots 11 as an example, when the incident light from the backlight source onto the two light receiving surfaces 21 is reflected and becomes emergent light exiting in two specific directions by using the two light receiving surfaces 21, the schematic diagram of the corresponding light splitting may be as shown in FIG. 3 (in FIG. 3, it is assumed that the incident light emitted from the backlight source is parallel light), which is not redundantly described in the embodiment of the present invention.

That is, in the embodiment of the present invention, as the triangular pyramid dots 11 capable of converting incident light from a backlight source into emergent light exiting in two specific directions are provided in the light guide plate 10, the effect of dual-view backlight can be realized, while a dual-view backlight structure with simpler structure and lower cost is provided.

It should be noted that, in the embodiment of the present invention, when a certain surface is determined as a reflective mirror surface, it means that the surface is a smooth reflective surface, and when the incident light received by the surface is parallel light, the surface can reflect emergent light in the form of parallel light, which is not redundantly described in the embodiment of the present invention.

Further, in an embodiment of the present invention, for any one of the triangular pyramid dots 11, the two light receiving surfaces 21 may be respectively coated with a highly reflective material, to achieve the effect of reflecting the incident light received from the backlight source onto the upper surface of the light guide plate 10 to a large extent. The highly reflective material may be any one or a combination of more of silver, aluminum and copper, which is not limited in the embodiment of the present invention. Furthermore, in an embodiment of the present invention, the highly reflective material used for the two light receiving surfaces 21 of each of the triangular pyramid dots 11 may be the same material, to achieve the purpose of equivalently reflecting incident light, which is not redundantly described in the embodiment of the present invention.

Further, in an embodiment of the present invention, for any two of the triangular pyramid dots 11, generally, the any two triangular pyramid dots 11 may be the same in size and shape, thus the purpose of equivalently reflecting incident light to obtain relatively uniform emergent light is achieved, while the preparation process is simplified. Specifically, in an embodiment of the present invention, all of the triangular pyramid dots 11 may be regular triangular pyramid dots of the same size, which is not limited in the embodiment of the present invention.

Further, in an embodiment of the present invention, the bottom surface of each of the triangular pyramid dots 11 may be parallel to the lower surface of the light guide plate 10, so as to achieve the purpose of equivalently reflecting the incident light.

Further, in an embodiments of the present invention, the bottom surface of each of the triangular pyramid dots 11 may be located in a same plane, and the same plane may be a plane parallel to a plane where the lower surface (or the upper surface) of the light guide plate 10 is located or a plane coinciding with a plane where the lower surface of the light guide plate 10 is located (i.e., the lower surface of the light guide plate 10), which is not limited in the embodiment of the present invention. In addition, it should be noted that, in the embodiment of the present invention, as the triangular pyramid dots 11 may be dots of the same size and shape, a plane formed by vertices of each of the triangular pyramid dots 11 may be also in another same plane correspondingly, and the another same plane may be a plane parallel to a plane where the upper surface (or the lower surface) of the light guide plate 10 is located or a plane coinciding with a plane where the upper surface of the light guide plate 10 is located (i.e., the upper surface of the light guide plate 10), which is also not limited in the embodiment of the present invention.

Figure 4:
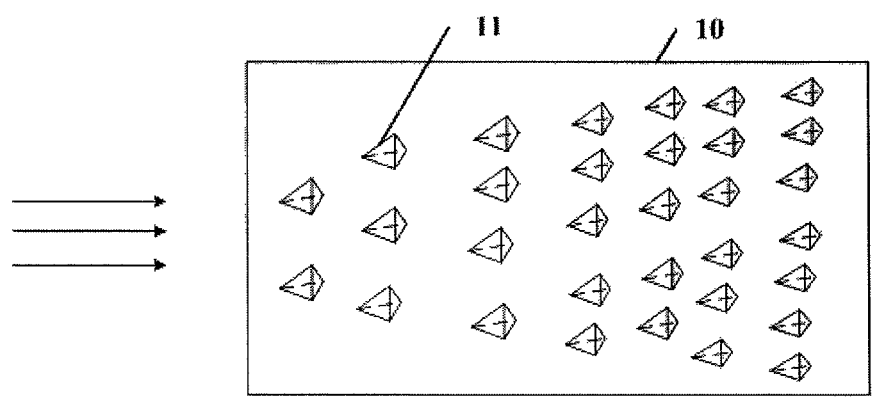
FIG. 4 is a schematic diagram illustrating changing density distribution of triangular pyramid dots in a light guide plate provided by an embodiment of the present invention.

Further, for the light guide plate 10, the farther a region is away from the backlight source, the lower the intensity of the incident light received by the region is, which results in that the emergent light exiting from the upper surface of the light guide plate 10 is not uniform. Therefore, to solve this problem, in an embodiment of the present invention, the density of the triangular pyramid dots 11 is gradiently distributed in the light guide plate 10, the farther a region is away from the backlight source is, the larger the density of the triangular pyramid dots 11 in the region is (specifically, referring to FIG. 4, in FIG. 4, the schematic illustration is given by taking a situation that the bottom surfaces of the triangular pyramid dots 11 are in a same plane as an example). That is to say, with a structure in which the density of the triangular pyramid dots 11 varies, the purpose of converting the incident light from the backlight source into uniform emergent light for uniformly illuminating the corresponding region of a liquid crystal display screen to form relatively uniform backlight may be achieved.

Further, in an embodiment of the present invention, the projection of a ridge between the two light receiving surfaces 21 of each of the triangular pyramid dots 11 on the lower surface of light guide plate 10 may be parallel to the direction of the incident light from the backlight source. That is to say, for any one of the triangular pyramid dots 11, a plane formed by the ridge between the two light receiving surfaces 21 and the projection of the ridge between the two light receiving surfaces 21 on the lower surface of the light guide plate 10 may be vertical to a side surface of the light guide plate 10 facing the backlight source, so that the two light receiving surfaces 21 may uniformly receive the incident light from the backlight source.

Further, in an embodiment of the present invention, the bottom surface of each of the triangular pyramid dots 11 may be isosceles triangle shaped. Specifically, for any one of the triangular pyramid dots 11, ridges between the bottom surface and the two light receiving surfaces 21 may be the two equal-length sides of the isosceles triangle. In this case, when the projection of a ridge between the two light receiving surfaces 21 of each of the triangular pyramid dots 11 on the lower surface of the light guide plate may be parallel to the direction of the incident light from the backlight source, and when the same plane where the bottom surfaces of the triangular pyramid dots 11 are located is a plane parallel to the plane where the lower surface of the light guide plate 10 is located or a plane coinciding with the plane where the lower surface of the light guide plate 10 is located, each of the triangular pyramid dots 11 may be arranged facing the backlight source, so that the purpose of reflecting the incident light from the backlight source onto the upper surface of the light guide plate 10 to a large extent can be achieved. Moreover, as the two light receiving surfaces 21 may be triangles of the same size and same shape, the effect of improving the uniformity of backlight for different view angles can also be achieved.

Further, in an embodiment of the present invention, the surface other than the bottom surface and the two light receiving surfaces 21 of each of the triangular pyramid dots 11 may be a light absorbing surface 22. The light absorbing surface 22 may be coated with a black light absorbing material. That is, the outgoing of parasitic light in the light guide plate 10 may be effectively reduced by providing the light absorbing surface which does not reflect light basically, so that both the directivity of the emergent light of the backlight module and the confidentiality of the whole display device are further improved.

In addition, it should be noted that, in an embodiment of the present invention, the surface other than the bottom surface and the two light receiving surfaces 21 of each of the triangular pyramid dots 11 may also be a light transmittable back surface in place of light absorbable back surface 22. In this case, if a backlight source is disposed at a side of the light guide plate 10 facing the light transmittable back surface of each of the triangular pyramid dots 11, light emitted from the backlight source will reach the light transmittable back surface of each of the triangular pyramid dots 11, then reach the two reflective mirror surfaces of each of the triangular pyramid dots 11 after passing through the inside of each of the triangular pyramid dots 11, and finally be reflected and become emergent light exiting in two specific directions by the two reflective mirror surfaces of each of the triangular pyramid dots 11, and the emergent light is emitted out from the lower surface of the light guide plate 10. That is to say, in this case, if a display panel is provided on the lower surface of the light guide plate 10, the effect of divided-view backlight can still be realized. Or, if the lower surface of the light guide plate 10 is used as the upper surface and provided with a display panel thereon, the effect of divided-view backlight can still be realized, which is not redundantly described in the embodiment of the present invention.

Further, in an embodiment of the present invention, for any one of the triangular pyramid dots 11, the length of a ridge between any one light receiving surface 21 and the light absorbing surface 22 is usually not greater than that of other two of the three ridges included in the light receiving surface 21. That is, by setting the two light receiving surfaces 21 as surfaces having larger area than the light absorbing surface 22, the purpose of better receiving the incident light from the backlight source and reflecting the incident light from the backlight source onto the upper surface of the light guide plate 10 to a large extent can be achieved.

Figure 5:
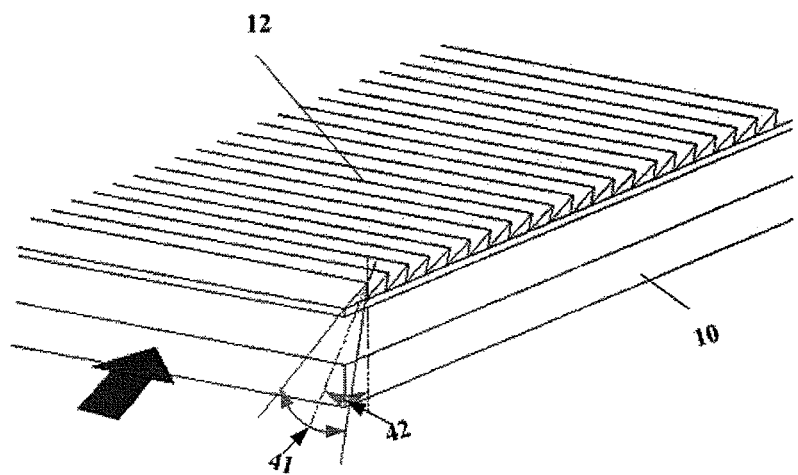
FIG. 5 is a schematic diagram of a structure of a view angle control prism layer provided by an embodiment of the present invention.

Further, as shown in FIG. 5, in an embodiment of the present invention, a view angle control prism layer 12, configured to control the view angle and the direction of the emergent light exiting from the upper surface of the light guide plate 10, may also be provided on the upper surface of the light guide plate 10.

Specifically, the view angle control prism layer 12 may be provided with a plurality of triangular prisms, the central axes of the triangular prisms are parallel to each another, and ridges between two refracting surfaces of the triangular prisms may be arranged in a same plane. The refracting surfaces are planes through which light enter into or exit from the triangular prism, and also referred to as side surfaces.

Figure 6:
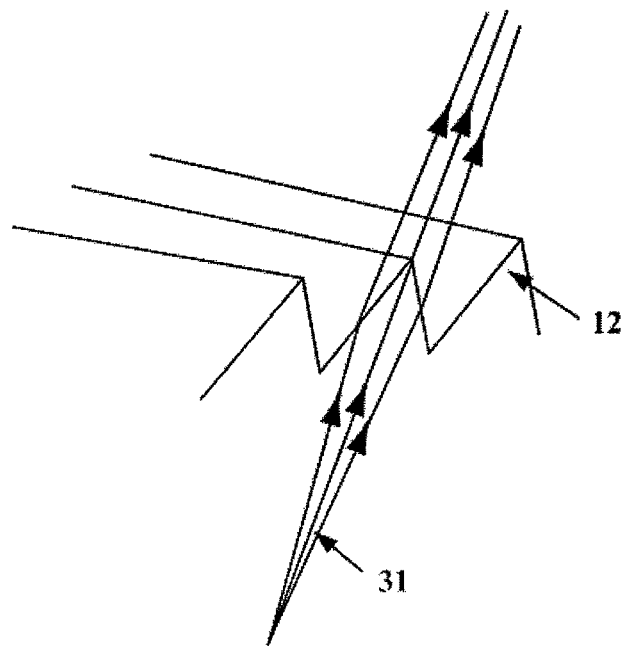
FIG. 6 is a schematic diagram illustrating light convergence function of a view angle control prism layer provided by an embodiment of the present invention.

Here, when light 31 exiting from the upper surface of the light guide plate 10 passes through the view angle control prism layer 12, the effects of light convergence (for example, as shown in FIG. 6) and ray angle deviation and so on will occur due to the refraction by the prism layer, and therefore, the purpose of reducing the view angle of the light guide plate 10 or realizing the angle deviation of the emergent light can be achieved.

As the convergence effect of the view angle control prism layer 12 on the emergent light may be influenced by the degrees of prism vertex angles 41 (called vertex angles for short) of the respective triangular prisms, and the deviation effect of the view angle control prism layer 12 on the emergent light angle may be influenced by the degrees of prism deflection angles 42 (called deflection angles for short) of the respective triangular prisms, the degrees of the prism vertex angles 41 and the prism deflection angles 42 of the respective triangular prisms may be adjusted correspondingly according to actual conditions, so that the control on a visual scope and a dual-view region of the emergent light is realized by changing the degrees of the prism vertex angles 41 and the degrees of the prism deflection angles 42, which will not be redundantly described in the embodiment of the present invention.

Specifically, as shown in FIG. 5, for any one of the triangular prisms, the prism vertex angle 41 of the triangular prism refers to an included angle between the two refracting surfaces of the triangular prism; the prism deflection angle 42 of the triangular prism refers to an included angle between a straight line, which is defined by a vertex of the principal section of the triangular prism and a projection point of the vertex on the upper surface of the light guide plate 10 (or the bottom surface of the triangular prism), and a bisector of the prism vertex angle 41 of the triangular prism. Here, the principal section of the triangular prism refers to section perpendicular to the bottom surface of the triangular prism, and the bottom surface of the triangular prism refers to a surface facing the vertex angle of the triangular prism, which is not redundantly described in the embodiment of the present invention.

Further, in an embodiment of the present invention, for any two of the triangular prisms, the any two triangular prisms may be the same in both size and shape, to achieve the effect of uniformly controlling the emergent light.

Further, in an embodiment of the present invention, for any one of the triangular prisms, a ridge between two refracting surfaces of the any one of the triangular prisms may be perpendicular or parallel to a side surface of the light guide plate 10 facing the backlight source. That is to say, when it is assumed that the plane where the upper surface or lower surface of the light guide plate 10 is located is a horizontal plane, the triangular prisms may be successively arranged on the upper surface of the light guide plate 10 in parallel along a horizontal axis or along a vertical axis, which is not limited in the embodiment of the present invention. As an example, in FIG. 5, the triangular prisms are successively arranged on the upper surface of the light guide plate 10 in parallel along the horizontal axis.

Further, in an embodiment of the present invention, for any one of the triangular prisms, the vertex angle may be usually arranged away from the upper surface of the light guide plate 10. Furthermore, for any one of the triangular prisms, the areas of the two refracting surfaces may be the same or different, which is not limited in the embodiment of the present invention.

Based on the same inventive concept, the embodiments of the present invention further provide a backlight module, which may include a backlight source and a light guide plate located at a side of the backlight source, wherein the light guide plate is any one of the above-mentioned light guide plates 10 provided by the embodiments of the present invention.

Specifically, the backlight source may be specifically a Light-Emitting Diode (LED), a Cold Cathode Fluorescence Lamp (CCFL) or an Electro-Luminescence Display (ELD), etc., which is not limited in the embodiment of the present invention. Moreover, there may be one or more backlight sources, which is not limited in the embodiment of the present invention.

Further, in order to narrow the emitting angle of a light source and further to achieve the effect of improving the utilization efficiency of the light source, in an embodiment of the present invention, the backlight source may be usually a collimating light source, i.e., a light source which is obtained by additionally providing a collimator on a common light source and is capable of emitting collimated parallel light, which is not redundantly described in the embodiment of the present invention.

Based on the same inventive concept, the embodiments of the present invention further provide a display device, which includes any of the above-mentioned backlight modules provided by the embodiments of the present invention. Specifically, the display device may be a mobile phone, a tablet computer, a vehicle-mounted display device and any other product or part having a display function, which is not limited in the embodiment of the present invention. In addition, the implementation of the display device may refer to the embodiments of the backlight module having the corresponding light guide plate and will not be repeated here.

The embodiments of the present invention provide a light guide plate, a backlight module and a display device. A plurality of triangular pyramid dots are provided in the light guide plate. Two of four surfaces of each of the triangular pyramid dots are light receiving surfaces facing a backlight source, and the two light receiving surfaces are reflective mirror surfaces, so that incident light reaching the two light receiving surfaces from the backlight source is reflected and becomes emergent light exiting in two different directions, and then the emergent light is emitted from the upper surface of the light guide plate. In the technical solutions provided by the embodiments of the present invention, as the triangular pyramid dots capable of converting incident light from a backlight source into emergent light exiting in two specific directions are provided in a light guide plate, the effect of dual-view backlight may be realized, while a dual-view backlight structure with simpler structure and lower cost is provided.

Although the preferable embodiments of the present invention have been described, those skilled in the art may make additional alterations and modifications to these embodiments after learning about the basic creative concept of the present invention. Therefore, the appended claims are intended to be interpreted as including the preferable embodiments and all the alterations and modifications within the scope of the present invention.

Apparently, those skilled in the art may make various modifications and variations to the present invention without departing from the spirit and scope of the present invention. Thus, if these modifications and variations of the present invention are within the scope of the claims of the present invention and equivalent techniques thereof, the present invention is intended to cover these modifications and variations.

The invention claimed is:

1. A light guide plate, used in a dual-view backlight module and comprising a plurality of triangular pyramid dots provided therein, wherein one of four surfaces of each of the triangular pyramid dots is a light receiving surface facing a backlight source, two surfaces other than a bottom surface and the light receiving surface are two light reflective surfaces, the two light reflective surfaces are reflective mirror surfaces, so that incident light that reaches the two light reflective surfaces after passing through the light receiving surface from the backlight source is reflected and becomes emergent light exiting from the bottom surface in two different directions, and then the emergent light is emitted out from a lower surface of the light guide plate.

2. The light guide plate according to claim 1, wherein each of the two light reflective surfaces comprises three ridges associated therewith, and
  wherein a length of a ridge between at least one of the two light reflective surfaces and the light receiving surface is not greater than that of the other two ridges of the at least one of the two light reflective surfaces.

3. The light guide plate according to claim 1, wherein a bottom surface of each of the triangular pyramid dots is parallel to a lower surface of the light guide plate.

4. The light guide plate according to claim 1 wherein a bottom surface of each of the triangular pyramid dots is isosceles triangle shaped.

5. The light guide plate according to claim 1, wherein the triangular pyramid dots are a plurality of regular triangular pyramid dots of the same size.

6. The light guide plate according to claim 1, wherein the two light reflective surfaces are both coated with a highly reflective material.

7. The light guide plate according to claim 6, wherein the highly reflective material is any one or a combination of silver, aluminum and copper.

8. The light guide plate according to claim 6, wherein the two light reflective surfaces are coated with the same highly reflective material.

9. The light guide plate according to claim 1, wherein a projection of a ridge between the two light reflective surfaces of each of the triangular pyramid dots on the lower surface of the light guide plate is parallel to a direction of the incident light from the backlight source.

10. The light guide plate according to claim 1, wherein density of the triangular pyramid dots is gradiently distributed in the light guide plate, the farther a region is away from the backlight source, the larger the density of the triangular pyramid dots in the region is.

11. The light guide plate according to claim 1, wherein a view angle control prism layer, which is configured to control a view angle and a direction of the emergent light exiting from the lower surface of the light guide plate, is provided on the lower surface of the light guide plate.

12. The light guide plate according to claim 11, wherein view angle control prism layer is provided with a plurality of triangular prisms, central axes of the triangular prisms are parallel to each another, and ridges between two refracting surfaces of the triangular prisms are arranged in a same plane.

13. The light guide plate according to claim 12, wherein the triangular prisms are the same in size and shape.

14. A backlight module, comprising a backlight source and a light guide plate located at a side of the backlight source, wherein the light guide plate is the light guide plate according to claim 1.

15. The backlight module according to claim 14, wherein the backlight source is a collimating light source.

16. A display device, comprising the backlight module according to claim 14.

* * * * *